US011615081B2

United States Patent
Couto et al.

(10) Patent No.: US 11,615,081 B2
(45) Date of Patent: Mar. 28, 2023

(54) SYSTEMS AND METHODS FOR ADDRESSING ERRORS IN SQL STATEMENTS

(71) Applicant: Embarcadero Technologies, Inc., Austin, TX (US)

(72) Inventors: Walter Vigario Couto, Toronto (CA); Kimberly Ann Brushaber, Austin, TX (US)

(73) Assignee: Embarcadero Technologies, Inc., Austin, TX (US)

( * ) Notice: Subject to any disclaimer, the term of this patent is extended or adjusted under 35 U.S.C. 154(b) by 0 days.

(21) Appl. No.: 17/100,667

(22) Filed: Nov. 20, 2020

(65) Prior Publication Data

US 2021/0165788 A1 Jun. 3, 2021

Related U.S. Application Data

(60) Provisional application No. 62/943,162, filed on Dec. 3, 2019.

(51) Int. Cl.
*G06F 16/242* (2019.01)
*G06F 16/2457* (2019.01)

(52) U.S. Cl.
CPC .... *G06F 16/2438* (2019.01); *G06F 16/24575* (2019.01)

(58) Field of Classification Search
CPC ............... G06F 16/2438; G06F 16/24575
See application file for complete search history.

(56) References Cited

U.S. PATENT DOCUMENTS

2005/0149537 A1* 7/2005 Balin .................... G06F 16/214
2017/0068819 A1* 3/2017 Anand .................. G06F 21/52

OTHER PUBLICATIONS

Oracle Database Online Documentation, 10g Release 2 (10.2), Database SQL Reference, Graphic Syntax Diagrams Apr. 2010, Oracle (Year: 2010).*
SQL Server Create Table syntax diagrams, Phil Factor, Jun. 6, 2013, https://www.red-gate.com/simple-talk/databases/sql-server/t-sql-programming-sql-server/sql-server-create-table-syntax-diagrams/ (Year: 2013).*

* cited by examiner

*Primary Examiner* — Anhtai V Tran
*Assistant Examiner* — Xiaoqin Hu
(74) *Attorney, Agent, or Firm* — Foley & Lardner LLP

(57) ABSTRACT

A method includes determining that a parser fails to parse an invalid structured query language (SQL) statement. In response to determining that the parser fails to parse the invalid SQL statement, the method generates, by an error parser, an output corresponding to the invalid SQL statement. The output includes a plurality of data structures arranged in a tree structure. Each of the plurality of data structures corresponds to a portion of the invalid SQL statement.

17 Claims, 21 Drawing Sheets

First Dialect

```
SELECT time, subject, val,
    FIRST_VALUE(val) OVER (PARTITION BY subject ORDER BY time
        ROWS UNBOUNDED PRECEDING) as 'first',
    LAST_VALUE(val) OVER (PARTITION BY subject ORDER BY time
        ROWS UNBOUNDED PRECEDING) as 'last',
    CUME_DIST() OVER (PARTITION BY subject ORDER BY time) as 'cume_dist',
    PERCENT_RANK() OVER (PARTITION BY subject ORDER BY time) as 'percent_rank'
FROM observations
```
⟵ 400a

Second Dialect

```
SELECT time, subject, val,
    FIRST_VALUE(val) OVER (PARTITION BY subject ORDER BY time
        RANGE BETWEEN UNBOUNDED PRECEDING AND CURRENT ROW) as 'first',
    LAST_VALUE(val) OVER (PARTITION BY subject ORDER BY time
        RANGE BETWEEN UNBOUNDED PRECEDING AND CURRENT ROW) as 'last',
    CUME_DIST() OVER (PARTITION BY subject ORDER BY time
        RANGE BETWEEN UNBOUNDED PRECEDING AND CURRENT ROW) as 'cume_dist',
    PERCENT_RANK() OVER (PARTITION BY subject ORDER BY time
        RANGE BETWEEN UNBOUNDED PRECEDING AND CURRENT ROW) as 'percent_rank'
FROM observations
```
⟵ 400b

Third Dialect

```
SELECT time, subject, val,
    FIRST_VALUE(val) OVER w AS 'first',
    LAST_VALUE(val) OVER w AS 'last',
    CUME_DIST() OVER w AS 'cume_dist',
    PERCENT_RANK() OVER w AS 'percent_rank'
FROM observations
WINDOW w AS (PARTITION BY subject ORDER BY time
    ROWS UNBOUNDED PRECEDING)
```
⟵ 400c

FIG. 4

Example Syntax Diagram

```
<SELECT statement> ::=
    [ WITH { [ XMLNAMESPACES ,] [ <common_table_expression> [,...n] ] ]
    <query_expression>
    [ ORDER BY { order_by_expression | column_position [ ASC | DESC ] } 
[,...n]]
    [ <FOR Clause>]
    [ OPTION ( <query_hint> [,...n] ) ]
<query_expression> ::=
    { <query_specification> | ( <query_expression> ) }
    [ { UNION [ ALL ] | EXCEPT | INTERSECT }
    <query_specification> | ( <query_expression> ) [...n] ]
<query_specification> ::=
SELECT [ ALL | DISTINCT ]
    [TOP ( expression ) [PERCENT] [ WITH TIES ] ]
    < select_list >
    [ INTO new_table ]
    [ FROM { <table_source> } [ ,...n ] ]
    [ WHERE <search_condition> ]
    [ <GROUP BY> ]
    [ HAVING < search_condition > ]
```

Lexer Rules

SELECT: S E L E C T;

/**
 *single line comments
 *
 *CHECK:
 *If the user enters a "--+" then it will be considered
 *as a hint and a HINT token is sent to the parser. So
 *the user should not have a comment starting with '+' immediately.
 *
 */
SINGLE_LINE_HINT:
    SUBTRACT SUBTRACT PLUS ~[\r\n]*
;

/**
 *multi line comments
 *
 *CHECK:
 *If the user enters a "/*+" then it will be considered
 *as a hint and a HINT token is sent to the parser. So
 *the user should not have a comment starting with '+' immediately.
 *
 */
MULTI_LINE_HINT:
    ((FORWARD_SLASH) (STAR) PLUS
    // Handle embedded comments and / or * characters not part of /* or */
    ((FORWARD_SLASH) MULTI_LINE_COMMENT | ~[/*] (FORWARD_SLASH)+ ~[/*] (STAR)+ ~[/*])*
    // Handle * characters at the end of the file
    (STAR)*
    MULTI_LINE_COMMENT_NON_STARTED)
;

Parser Rules

800

```
subquerySubPartDef:
    selectClause
    ( selectIntoClause )?
    fromClause
    ( whereClause )?
    ( subquerySubPartOptions )?
    ({getServerVersion() >= 1001}? subquerySubPartModelDef )?
    ( orderByClause )?
    ({getServerVersion() >= 1201}? rowLimitingClause )?
    ;

selectClause:
    SELECT ( hint )? ( queryPreamble )? selectList
    ;
```

FIG. 8

Parse Tree / Fragment Tree Example

```
start
    sqlMultipleStatements
        sqlStatement
            sqlCommand
                subOrSelectCommandNoCTE
                    subOrSelectCommandDef
                        select
                            nestedSubQuery
                                querySpecification
                                    querySpecificationWithFrom
                                        querySpecificationWithFromStart
                                            selectClause "SELECT"
                                                selectList
                                                    columnExpr
                                                        selExpr
                                                            expression
                                                                compoundExpr
                                                                    compoundExpr2
                                                                        compoundExpr2_2005
                                                                            userDefinedFunctionsOrSimpleExpr
                                                                                columnName
                                                                                    identifier "time"
                                                    ","
                                                    selectList
                                                        columnExpr
                                                            selExpr
                                                                expression
                                                                    compoundExpr
                                                                        compoundExpr2
                                                                            compoundExpr2_2005
                                                                                userDefinedFunctionsOrSimpleExpr
                                                                                    columnName
                                                                                        identifier "subject"
                                                        ","
                                                        selectList
                                                            columnExpr
                                                                selExpr
                                                                    expression
                                                                        compoundExpr
                                                                            compoundExpr2
                                                                                compoundExpr2_2005
                                                                                    userDefinedFunctionsOrSimpleExpr
                                                                                        columnName
                                                                                            identifier "val"
```

FIG. 9A

"PRECEDING"
                                                    ")"
                                      "as"
                          identOrAtIdentOrLiteralNoColon
                           identOrAtIdentOrLiteral
                             text
                               quotedString
                                 string_literal "'first'"
                  ","
                selectList
              columnExpr
                selExpr
                  expression
                    compoundExpr
                      compoundExpr2
                        compoundExpr2_2005
                          builtinfunctions
                            analyticFunction "LAST_VALUE" "("
                              expressionAsFunctionParamList
                                expressionAsFunctionParam
                                  expression
                                    compoundExpr
                                      compoundExpr2
                                        compoundExpr2_2005

900 userDefinedFunctionsOrSimpleExpr
                                                                columnName
                                                                   identifier "val"
                            ")"
                          overClauseRowRange "OVER" "("
                              partitionByClause "PARTITION" "BY"
                                expressionList
                                  expression
                                    compoundExpr
                                      compoundExpr2
                                        compoundExpr2_2005 userDefinedFunctionsOrSimpleExpr
                                                              columnName
                                                               identifier "subject"
                          orderByClause "ORDER" "BY"
                            orderByLoop
                              orderByExpr
                                expression
                                  compoundExpr
                                    compoundExpr2
                                      compoundExpr2_2005

FIG. 9C

```
userDefinedFunctionsOrSimpleExpr
                                        columnName
                                            identifier "time"
                        ")"
                "as"
                identOrAtIdentOrLiteralNoColon
                identOrAtIdentOrLiteral
                    text
                    quotedString
                        string_literal "'cume_dist'"
            ","
            selectList
          columnExpr
           selExpr
              expression
                 compoundExpr
                    compoundExpr2
                       compoundExpr2_2005
                          builtinfunctions
                             analyticFunction "PERCENT_RANK" "(" ")"
                             overClauseRowRange "OVER" "("
                                partitionByClause "PARTITION" "BY"
                                   expressionList
                                      expression
                                         compoundExpr
                                            compoundExpr2
                                               compoundExpr2_2005
userDefinedFunctionsOrSimpleExpr
                                        columnName
                                           identifier "subject"
                                orderByClause "ORDER" "BY"
                                   orderByLoop
                                      orderByExpr
                                         expression
                                            compoundExpr
                                               compoundExpr2
                                                  compoundExpr2_2005
userDefinedFunctionsOrSimpleExpr
                                        columnName
                                           identifier "time"
                         ")"
                "as"
                identOrAtIdentOrLiteralNoColon
                identOrAtIdentOrLiteral
                    text
                       quotedString
                          string_literal "'percent_rank'"
        fromClause "FROM"
          tableSourceLoop
             tableSource
                tableSourceWithoutFrag
                   tableSourceExpr
                      tableName
                         identifier "observations"
```

FIG. 9E

```
expression => EXPRESSION "LAST_VALUE(val) OVER..."
        builtinfunctions => BUILTINFUNCTION "LAST_VALUE(val) OVER..."
            expressionAsFunctionParamList => FUNCTIONPARAMETERSLIST "val"
                expressionAsFunctionParam => FUNCTIONPARAMETER "val"
                    expression => EXPRESSION "val"
                        columnName => COLUMNNAME "val"
            expression => EXPRESSION "subject"
                columnName => COLUMNNAME "subject"
            orderByClause => ORDERBYCLAUSE "ORDER BY time"
                orderByExpr=>ORDERBYCOLUMN "time"
                    expression => EXPRESSION "time"
                        columnName => COLUMNNAME "time"
selectList => SELECTCOLUMN "CUME_DIST() OVER..."
expression => EXPRESSION "CUME_DIST() OVER..."
        builtinfunctions => BUILTINFUNCTION "CUME_DIST() OVER..."
            expression => EXPRESSION "subject"
                columnName => COLUMNNAME "subject"
            orderByClause => ORDERBYCLAUSE "ORDER BY time"
                orderByExpr=>ORDERBYCOLUMN "time"
                    expression => EXPRESSION "time"
                        columnName => COLUMNNAME "time"
selectList => SELECTCOLUMN "PERCENT_RANK() OVER..."
expression => EXPRESSION "PERCENT_RANK() OVER..."
        builtinfunctions => BUILTINFUNCTION "PERCENT_RANK() OVER..."
            expression => EXPRESSION "subject"
                columnName => COLUMNNAME "subject"
            orderByClause => ORDERBYCLAUSE "ORDER BY time"
                orderByExpr=>ORDERBYCOLUMN "time"
                    expression => EXPRESSION "time"
                        columnName => COLUMNNAME "time"
fromClause => FROMCLAUSE "FROM observations"
    tableSource=>TABLEREFERENCE "observations"
```

API Tree

```
ISQLCommand
  ISelectStatement
    ISelectClause
      ISelectColumn
        ISQLFragment
          IColumnName
      ISelectColumn
        ISQLFragment
          IColumnName
      ISelectColumn
        ISQLFragment
          IColumnName
      ISelectColumn
        ISQLFragment
          IBuiltinFunctionFragment
            ISQLFragment
              ISQLFragment
                ISQLFragment
                  IColumnName
              ISQLFragment
                IColumnName
              ISQLFragment
                IColumnName
                IOrderByClause
                  IOrderByColumn
                    ISQLFragment
                      IColumnName
```

SQLCOMMAND: create or replace no force view aName select * from atable
  CREATEVIEW: create or replace no force view aName select * from atable
    SQLCOMMAND: select * from atable
      SELECTSTATEMENT: select * from atable
        SELECTCLAUSE: select *
         SELECTCOLUMN: *
        FROMCLAUSE: from atable
         TABLEREFERENCE: atable

SQLCOMMAND: select max(salary) s from
  SELECTSTATEMENT: select max(salary) s from
    SELECTCLAUSE: select max(salary) s
      SELECTCOLUMN: max(salary) s
        EXPRESSION: max(salary)
         FUNCTIONPARAMETERSLIST: salary
          FUNCTIONPARAMETER: salary
           EXPRESSION: salary
            COLUMNNAME: salary
    FROMCLAUSE: from

FIG. 13B

```
SQLCOMMAND: select max(salary) s from
  SELECTSTATEMENT: select max(salary) s from
    SELECTCLAUSE: select max(salary) s
      SELECTCOLUMN: max(salary) s
        EXPRESSION: max(salary)
          FUNCTIONPARAMETERSLIST: salary
            FUNCTIONPARAMETER: salary
              EXPRESSION: salary
                COLUMNNAME: salary
    FROMCLAUSE: from
      TABLEREFERENCE: dbo.
```

```
SQLCOMMAND: select distinct col1, , 9, pow(2,3) into bob from emp where col1 = 89
  SELECTSTATEMENT: select distinct col1, , 9, pow(2,3) into bob from emp where col1 = 89
    SELECTCLAUSE: select distinct col1, , 9, pow(2,3)
      SELECTPREAMBLE: distinct
      SELECTCOLUMN: col1
        EXPRESSION: col1
          COLUMNNAME: col1
      SELECTCOLUMN: 9
        EXPRESSION: 9
      SELECTCOLUMN: pow(2,3)
        EXPRESSION: pow(2,3)
    SELECTINTOCLAUSE: into bob
      EXPRESSION: bob
    FROMCLAUSE: from emp
      TABLEREFERENCE: emp
    WHERECLAUSE: where col1 = 89
      CONDITION: col1 = 89
        CONDITIONBODY: col1 = 89
          LEFTEXPRESSION: col1
            EXPRESSION: col1
              COLUMNNAME: col1
          RIGHTEXPRESSION: 89
            LEFTEXPRESSION: 89
              EXPRESSION: 89
```

```
SQLCOMMAND: create table tablename ( col int, col2 varchar2(25), select int ) as
( select * from atable)
  CREATETABLE: create table tablename ( col int, col2 varchar2(25), select int ) as
( select * from atable)
    RELATIONALPROPERTIES: ( col int, col2 varchar2(25), select int )
      COLUMNDEFINITION: col int
        DATATYPE: int
      COLUMNDEFINITION: col2 varchar2(25)
        DATATYPE: varchar2(25)
      COLUMNDEFINITION: select int
        DATATYPE: int
    TABLEAS: as ( select * from atable)
      SQLCOMMAND: ( select * from atable)
        SELECTSTATEMENT: ( select * from atable)
          SELECTCLAUSE: select *
            SELECTCOLUMN: *
          FROMCLAUSE: from atable
            TABLEREFERENCE: atable
```

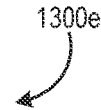

SYSTEMS AND METHODS FOR ADDRESSING ERRORS IN SQL STATEMENTS

CROSS-REFERENCE TO RELATED APPLICATIONS AND CLAIM OF PRIORITY

This application claims the benefit of U.S. Provisional Application No. 62/943,162, filed Dec. 3, 2019, the content of which are fully incorporated herein by reference in its entirety.

BACKGROUND

Structured query language (SQL) is a programming language used for maintaining data in relational databases. Relational databases rely upon parsed SQL statements for translating incoming information into outputs that various types of databases and application software can understand and process. Such databases and application software can use the translated or parsed information for various purposes and tasks including but not limited to, reverse engineering, forward engineering, code completion, script optimization, and so on. For example, a user can enter a SQL statement to request a parser to return all tables from the SQL statements. The parser can parse the SQL statement, process the parsed SQL statement, and pull those tables out of a database.

The above information disclosed in this Background section is for enhancement of understanding of the background of the disclosure, and therefore, it can contain information that does not constitute prior art.

SUMMARY

Certain examples described herein relate to a method that includes determining that a parser fails to parse an invalid structured query language (SQL) statement, and, in response to determining that the parser fails to parse the invalid SQL statement, generating, by an error parser, an output corresponding to the invalid SQL statement, the output includes a plurality of data structures arranged in a tree structure, each of the plurality of data structures corresponds to a portion of the invalid SQL statement.

In further examples, the parser fails to parse the invalid SQL statement due to one or more of the invalid SQL statement containing at least one syntax error, the invalid SQL statement being incomplete, or the parser being out-of-date.

In further examples, the method further includes receiving, by the parser, a plurality of SQL statements, the plurality of SQL statements include the invalid SQL statement. In such examples, identifying the invalid SQL statement includes identifying a beginning and an end of the invalid SQL statement. In addition, the beginning of the invalid SQL statement corresponds to a beginning character or symbol following a previous SQL statement. In addition, the end of the invalid SQL statement corresponds to an end character or symbol.

In further examples, the method further includes generating a representation of each of a plurality of dialects of SQL statements, wherein generating the representation includes generating grammar rules for the SQL statements of each of the plurality of dialects based on a syntax diagram for each of the plurality of dialects, and wherein the grammar rules include lexer rules used to identify keywords in the syntax diagram and tokenize the keywords as tokens.

In further examples, generating the representation of each of the plurality of dialects of SQL statements further includes converting the syntax diagram for each of the plurality of dialects into a parse tree based on the grammar rules.

In further examples, the method further includes receiving, by the parser, a plurality of SQL statements, the plurality of SQL statements including the invalid SQL statement and a valid SQL statement; and generating, by the parser, another output corresponding to the valid SQL statement based on the parse tree, the another output includes another plurality of data structures arranged in another tree structure.

In further examples, the output corresponding to the invalid SQL statement is generated by the error parser based on the parse tree.

In further examples, the method further includes determining a statement type of the invalid SQL statement; and selecting the parse tree from a plurality of parse tree based on the statement type, the parse tree corresponds to the statement type.

Further examples relate to a non-transitory computer-readable medium having computer-readable instructions such that, when executed by a processor, causes the processor to: determine that a parser fails to parse an invalid structured query language (SQL) statement; and in response to determining that the parser fails to parse the invalid SQL statement, generate an output corresponding to the invalid SQL statement, the output including a plurality of data structures arranged in a tree structure, each of the plurality of data structures corresponds to a portion of the invalid SQL statement.

In further examples of the non-transitory computer-readable medium, the parser fails to parse the invalid SQL statement due to one or more of the invalid SQL statement containing at least one syntax error, the invalid SQL statement being incomplete, or the parser being out-of-date.

In further examples of the non-transitory computer-readable medium, the processor is further caused to receive a plurality of SQL statements, the plurality of SQL statements including the invalid SQL statement. In such examples, identifying the invalid SQL statement includes identifying a beginning and an end of the invalid SQL statement. In addition, the beginning of the invalid SQL statement corresponds to a beginning character or symbol following a previous SQL statement. In addition, the end of the invalid SQL statement corresponds to an end character or symbol.

In further examples of the non-transitory computer-readable medium, the processor is further caused to generate a representation of each of a plurality of dialects of SQL statements. In such examples, generating the representation includes generating grammar rules for the SQL statements of each of the plurality of dialects based on a syntax diagram for each of the plurality of dialects. In addition, the grammar rules include lexer rules used to identify keywords in the syntax diagram and tokenize the keywords as tokens.

In further examples of the non-transitory computer-readable medium, generating the representation of each of the plurality of dialects of SQL statements further includes converting the syntax diagram for each of the plurality of dialects into a parse tree based on the grammar rules.

In further examples of the non-transitory computer-readable medium, the processor is further caused to: receive a plurality of SQL statements, the plurality of SQL statements including the invalid SQL statement and a valid SQL statement; and generate another output corresponding to the valid SQL statement based on the parse tree, the another output including another plurality of data structures arranged in another tree structure.

In further examples of the non-transitory computer-readable medium, the output corresponding to the invalid SQL statement is generated by an error parser based on the parse tree.

In further examples of the non-transitory computer-readable medium, the processor is further caused to: determine a statement type of the invalid SQL statement; and select the parse tree from a plurality of parse tree based on the statement type, the parse tree corresponds to the statement type.

Further examples relate to a system, including a memory unit; and a processor configured to: determine that a parser fails to parse an invalid structured query language (SQL) statement; and in response to determining that the parser fails to parse the invalid SQL statement, generate an output corresponding to the invalid SQL statement, the output includes a plurality of data structures arranged in a tree structure, each of the plurality of data structures corresponds to a portion of the invalid SQL statement.

In further examples of the system, the parser fails to parse the invalid SQL statement due to one or more of the invalid SQL statement containing at least one syntax error, the invalid SQL statement being incomplete, or the parser being out-of-date.

In further examples of the system, the processor is further configured to receive a plurality of SQL statements, where the plurality of SQL statements include the invalid SQL statement. In such examples, identifying the invalid SQL statement includes identifying a beginning and an end of the invalid SQL statement. In addition, the beginning of the invalid SQL statement corresponds to a beginning character or symbol following a previous SQL statement. In addition, the end of the invalid SQL statement corresponds to an end character or symbol.

In further examples of the system, the processor is further configured to generate a representation of each of a plurality of dialects of SQL statements, wherein generating the representation includes generating grammar rules for the SQL statements of each of the plurality of dialects based on a syntax diagram for each of the plurality of dialects; and the grammar rules include lexer rules used to identify keywords in the syntax diagram and tokenize the keywords as tokens.

In further examples of the system, generating the representation of each of the plurality of dialects of SQL statements further includes converting the syntax diagram for each of the plurality of dialects into a parse tree based on the grammar rules.

In further examples of the system, the processor is further configured to: receive a plurality of SQL statements, the plurality of SQL statements including the invalid SQL statement and a valid SQL statement; and generate another output corresponding to the valid SQL statement based on the parse tree, the another output includes another plurality of data structures arranged in another tree structure.

In further examples of the system, the output corresponding to the invalid SQL statement is generated by the error parser based on the parse tree.

In further examples of the system, the processor is further configured to: determine a statement type of the invalid SQL statement; and select the parse tree from a plurality of parse tree based on the statement type, the parse tree corresponds to the statement type.

BRIEF DESCRIPTION OF THE DRAWINGS

FIG. 4 is a diagram illustrating SQL statements in various dialects, according to some examples.

FIG. 6 is an example syntax diagram for a dialect, according to some examples.

FIG. 7 is a diagram illustrating lexer rules, according to some examples.

FIG. 8 is a diagram illustrating parser rules, according to some examples.

FIGS. 9A-9E are diagrams illustrating an example parse tree, according to some examples.

FIGS. 10A and 10B are diagrams illustrating an example annotated parse tree, according to some examples.

FIGS. 11A and 11B are diagrams illustrating an example API tree, according to some examples.

FIG. 13A-13E are diagrams illustrating example error parse trees used by an error parser, according to some examples.

DETAILED DESCRIPTION

Figure 1:
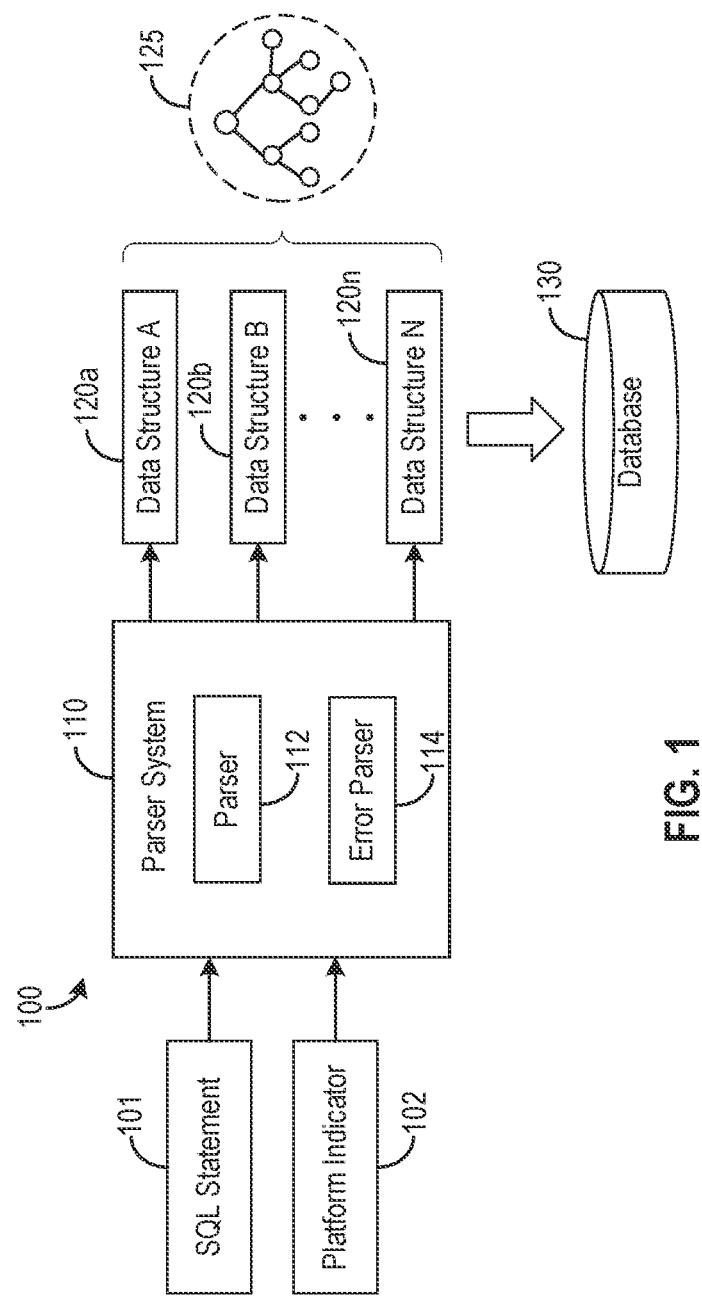
FIG. 1 is a block diagram illustrating a database system, according to some examples.

Hereinafter, example implementations will be described in more detail with reference to the accompanying drawings, in which like reference numbers refer to like elements throughout. The present disclosure, however, can be embodied in various different forms, and should not be construed as being limited to only the illustrated examples herein. Rather, these examples are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure cannot be described. Unless otherwise noted, like reference numerals denote like elements throughout the attached drawings and the written description.

A SQL statement (or SQL query statement) includes alphanumeric characters and symbols indicating an action or task (e.g., reverse engineering, forward engineering, code completion, script optimization, and so on) to be performed with respect to a relational database. Syntax refers to grammar rules or structures used for assembling the SQL characters to form a SQL statement.

A parser can break apart an SQL statement into multiple pieces, referred to herein as "fragments". Various database modeling, development, and administration software tools and applications can receive those fragments and use those fragments for various purposes. A tool may need a particular fragment or a particular type of fragments in SQL statements, and the parser can accept the SQL statements as input and output the particular fragment or the particular type of fragments for the tool.

In some arrangements, an application can generate an output based on a portion (or segment) of a SQL statement, each portion can include one or more fragments. For example, an optimizer application can "tune" a SQL statement by analyzing the SQL statement and suggest improvements to the SQL statement (e.g., adding hints to the SQL statement) to optimize the SQL statement. Such an optimizer application needs to segment the SQL statement into various portions and analyze each portion, in order to suggest improvements. Accordingly, such optimizer applications can tune normalized outputs (e.g., dedicated data structures in a token tree structure) of the parser.

In some arrangements, a database application can execute scripts having a large number of SQL statements separated by batch separators, each of which separates one set of SQL statements from another set of SQL statements. Each separator can be one or more valid SQL characters (e.g., alphanumeric characters and symbols), and are also portions of the SQL statements. Each separator is a portion of a SQL statement. Accordingly, such a database application can identify separators in a script having a large number of SQL statements using the normalized outputs (e.g., dedicated data structures in the token tree structure) of the parser.

In some arrangements, an editor can allow suggestions based on context. As a user is inputting information (e.g., a front clause in SQL characters) in the editor, the editor can recommend additional input that follows the information based on the context. The inputted information (e.g., an incomplete SQL statement) is a portion of a SQL statement. Accordingly, such an editor can identify the inputted information using the normalized outputs (e.g., dedicated data structures in the token tree structure) of the parser.

In some arrangements, a database application uses a parser to obtain information on certain properties of a SQL statement. The parser identifies portions of the SQL statement and analyze those portions to identify properties of the portions. In yet another example, a database application can reverse engineer and/or forward engineer databases by reading SQL statements and output information corresponding to the SQL statements in a manner that various software applications can understand. Accordingly, such a database application can identify the various portions of the SQL statement using the normalized outputs (e.g., dedicated data structures in the token tree structure) of the parser.

The parser can fail to parse an SQL statement for various reasons. In some cases, the SQL statement contains erroneous syntax (e.g., syntax errors). For example, the following SQL statement is invalid:

select * from dbo.

The parser determines that the above SQL statement as an invalid statement and returns an indication of the same. The above SQL statement is a "Select" statement having a "Select" clause "select *". The table that is being selected has a schema of "dbo". The rest of the above SQL statement cannot be derived by the parser and is invalid.

In some cases, a user is typing the SQL statement while the parser is attempting to parse the incomplete (and therefore invalid) SQL statement. In some cases, the parser is out-of-date and unable to parse an otherwise valid SQL statement, given that the SQL statement may contain one or more keywords or a sequence of keywords that the outdated parser does not recognize due to lack of rules for recognizing the keywords or the sequence of keywords.

In some arrangements, in response to detecting that the parser fails to parse an SQL statement, a beginning and an end of the SQL statement are determined. By determining the beginning and end of the SQL statement, the parse can skip the SQL statement that has caused the failure and can continue processing other SQL statements following that SQL statement. The error parser can alert the user of the invalid SQL statement (or an invalid portion thereof) or decline the entire SQL statement. In an example in which a user is in the middle of typing, the error parser can extract sufficient information from an incomplete SQL statement to determine or predict the SQL statement that the user intends to type and to provide code complete hints. In an editor context, the code complete hints indicate or suggest an un-typed portion of the predicted SQL statement. The un-typed portion follows the typed portion of the SQL statement. Accordingly, the arrangements disclosed herein allow identification of errors without disrupting processing of a remainder of the SQL statement.

In some arrangements, a user can feed, to a parser coupled to a suitable parser application programing interface (API), SQL statements of any SQL dialect, and the parser can return a uniform infrastructure to the user in a normalized pattern. As used herein, a dialect of SQL statements refers to a particular syntax, grammar, rules, organization, arrangement, layout, order, sequence, and/or other characteristics of SQL statement relating to the manner in which the SQL statements are written and processed. This allows various types of databases and application software to understand any SQL dialect in a generic and portable format. The uniform infrastructure corresponds to a token tree structure. For example, the disclosed parser can comprehensively and bilaterally translate between SQL statements and the token tree structure that represents the SQL query corresponding to the SQL statements. The parser divides an unparsed SQL statement, identifies one or more structures in the unparsed SQL statement, and separates those structures into dedicated data structures in the token tree structure. A data structure that is a common construct across different vendors or platforms (e.g., Microsoft® Azure Synapse Analytics, IBM® DB2 LUW, IBM® DB2 z/OS, Firebird, Greenplum, InterBase, MariaDB, PostgreSQL, Amazon® Redshift, Snowflake®, SQL 99, Microsoft® SQL Azure, SAP® Sybase ASE, SAP® Sybase IQ, Teradata, MySQL®, Oracle®, and SQL Server®, SQL Server® PDW, and so on) is identified by a unique identifier (ID) and is accessible across all vendors. Accordingly, the disclosed parser API allows a relational database to understand, in a single consistent format, SQL queries across multitudes of platforms.

In some arrangements, an error parser can generate a tree representation (e.g., the token tree structure) for invalid SQL statements which the parser cannot parse. In other words, the error parser can accept invalid SQL statements (with one or more syntax error or are not complete), extract as much information as possible from the invalid SQL statements, and generate tree representations of those invalid SQL statements like the parser would for valid SQL statements. Accordingly, the combination of the parser and the error parser can generate the tree representations of both valid and invalid SQL statements. The arrangements disclosed herein employ data structures (e.g., the tree representation) to organize and parse computer statements (e.g., SQL statements) to improve user-friendliness of computer programming and processing platforms, thus improving efficiency for SQL operations. Such arrangements are integrated in computer technology, particularly, in the processing of computer input commands. Such arrangements automate a computer process that has not been previously been automated.

FIG. 1 is a schematic diagram illustrating a database system 100 according to some examples. Referring to FIG. 1, the database system 100 includes a parser system 110 and a database 130. The parser system 110 manipulates or prepares SQL statements (e.g., a SQL statement 101) to be executed by or with respect to the database 130. The database 130 is any suitable relational database.

For example, the parser system 110 can divide the SQL statement 101. That is, the parser system 110 takes apart portions of the SQL statement 101 and identify what these portions are. The parser system 110 (e.g., a parser 112) can break apart a valid SQL statement. In some examples, the parser system 110 (e.g., an error parser 114) can break apart an invalid SQL statement. For example, the SQL statement 101 can be separated such that a first portion of the SQL statement 101 corresponds to data structure A 120a, a second portion of the SQL statement 101 corresponds to data structure B 120b, . . . , an $n^{th}$ portion of the SQL statement 101 corresponds to data structure N 120n. While n data structures 120a-120n are shown in FIG. 1, any number of data structures can be outputted for any given SQL statement 101, depending on the content of the SQL statement 101.

The parser system 110 includes the parser 112 configured to divide the unparsed SQL statement 101, to identify one or more structures in the unparsed SQL statement 101, and to separate those structures into dedicated data structures (e.g., the data structures 120a-120n) in a token tree structure 125. In some examples, the parser 112 is Another Tool for Language Recognition (ANTLR). A portion of a non-limiting example of the token tree structure 125 for a "Select" SQL statement (as the SQL statement 101) is shown below.

```
...
Select Statement
    Select Clause
        Column
    From Clause
        Table
    Where Clause
...
```

As shown, the token tree structure 125 can have a parent-child, node-like structure. For example, a combination of "Select Statement," "Select Clause," "Column," "From Clause," "Table," and "Where Clause" is a fragment that is arranged as nodes of the token tree structure 125. Each of "Select Statement," "Select Clause," "Column," "From Clause," "Table," and "Where Clause" is a token that is a data structure that corresponds to a respective one of various portions of the "Select" SQL statement. As such, the "Select" SQL statement corresponds to a "Select" fragment. "Select Statement" is a parent node of "Select Clause," "From Clause," and "Where Clause." "Select Clause," "From Clause," and "Where Clause" are child nodes or sub-fragments (or tokens) of "Select Statement." Child nodes of the same node are on a same level, denoted using the same indentation in the token tree structure 125. For example, "Select Clause," "From Clause," and "Where Clause" are the child nodes of the same node ("Select Statement") and are on the same level (have the same indentation). "Column" is the child node of "Select Clause" and the grandchild node of "Select Statement." Accordingly, a first node with increased indentation as compared to the indentation of a second node immediately before (above) the first node denotes that the first node is a child node of the second node, and that the second node is the parent node of the first node. Fragments maps one-to-one with interfaces described herein.

As described in further details herein, each of the data structures 120a-120n is a dedicated data structure that can be identified by an ID. Data structures that are common across different dialects are identified by a same unique ID.

In addition to the SQL statement 101, a platform indicator 102 for the SQL statement 101 can also be sent to the parser system 110 (the parser 112). The platform indicator 102 identifies a platform from which the SQL statement 101 is received, or identifies a platform for which the SQL statement 101 is generated. In other words, the SQL statement 101 is in the dialect of the platform identified by the platform indicator 102.

The parser system 110 can receive SQL statements of various dialects corresponding to different platforms. As such, the SQL statement 101 can be in any dialect. Regardless of the dialect in which the SQL statement 101 is, the parser system 110 (e.g., the parser 112 facilitated by a suitable parser API) can generate normalized outputs from the SQL statement 101, where the normalized outputs are the data structures 120a-120n in the token tree structure 125. A construct common across different dialects are identified by a same unique ID. That is, two SQL statements in two different dialects that invoke a same task to be performed with respect to a database (e.g., retrieving the same information from the database, updating the same data in the database, and so on) will have the same output (e.g., the same token tree structure 125 and the same data structures 120a-120n), even though the unparsed SQL statements themselves appear differently with regard to one or more of syntax, grammar, organization, arrangement, layout, and so on.

The data structures 120a-120n in the token tree structure 125 can be consumed by other applications or features of the database 130. For example, an optimizer application can tune the dedicated data structures 120a-120n in the token tree structure 125 instead of SQL statements of various different dialects. A database application can identify separators in a script having a large number of SQL statements (regardless of which dialect those SQL statements are in) using the data structures 120a-120n in the token tree structure 125, in the example in which the SQL statement 101 represents the large number of SQL statements. An editor can identify the information inputted by a user (regardless of which dialect the inputted information is in) using the data structures 120a-120n in the token tree structure 125. A database application can identify the various portions of the SQL statement 101 (regardless of which dialect the SQL statement 101 is in) using the data structures 120a-120n in the token tree structure 125.

In some arrangements, the parser 112 may determine that parsing the SQL statement 101 has failed (in the examples in which the SQL statement 101 is invalid). In response, the parser 112 triggers the error parser 114 to address the failure. In some examples, the parser system 110 receives a plurality of SQL statements, including the invalid SQL statement 101 and other SQL statements before and/or after the invalid SQL statement 101. In response to the failure to parse, the error parser 114 identifies the invalid SQL statement 101 by determining a beginning and an end of the invalid SQL statement 101. In some examples, the error parser 114 can instruct the parser 112 to skip the invalid SQL statement 101. The parser 112 then proceeds to parse a next SQL statement of the plurality of SQL statements that begins immediately after the end of the invalid SQL statement 101. In some examples, the error parser 114 can notify the user of the invalid SQL statement 101 by displaying the invalid SQL statement 101 on an output device. In some examples, the error parser 114 can display code complete hints to the user via the output device.

The error parser 114 is coded with predetermined rules to address particular types of invalid SQL statements. In some arrangements, the error parser 114 is coded with predetermined rules or logic to address invalid SQL statements such as but not limited to, "Select" statements, "Insert" statements, "Update" statements, "Pre-procedure" statements, "Pre-function" statements, "Create Tables" statements, and so on.

In some examples, the error parser 114 can divide the unparsed, invalid SQL statement 101, identify one or more structures in the invalid SQL statement 101, and to separate those structures into the dedicated data structures (e.g., the data structures 120a-120n) in the token tree structure 125. Accordingly, the parser 112 can generate the token tree structure 125 if the SQL statement 101 is valid, and the error parser 114 can generate the token tree structure 125 if the SQL statement 101 is invalid.

Figure 2:
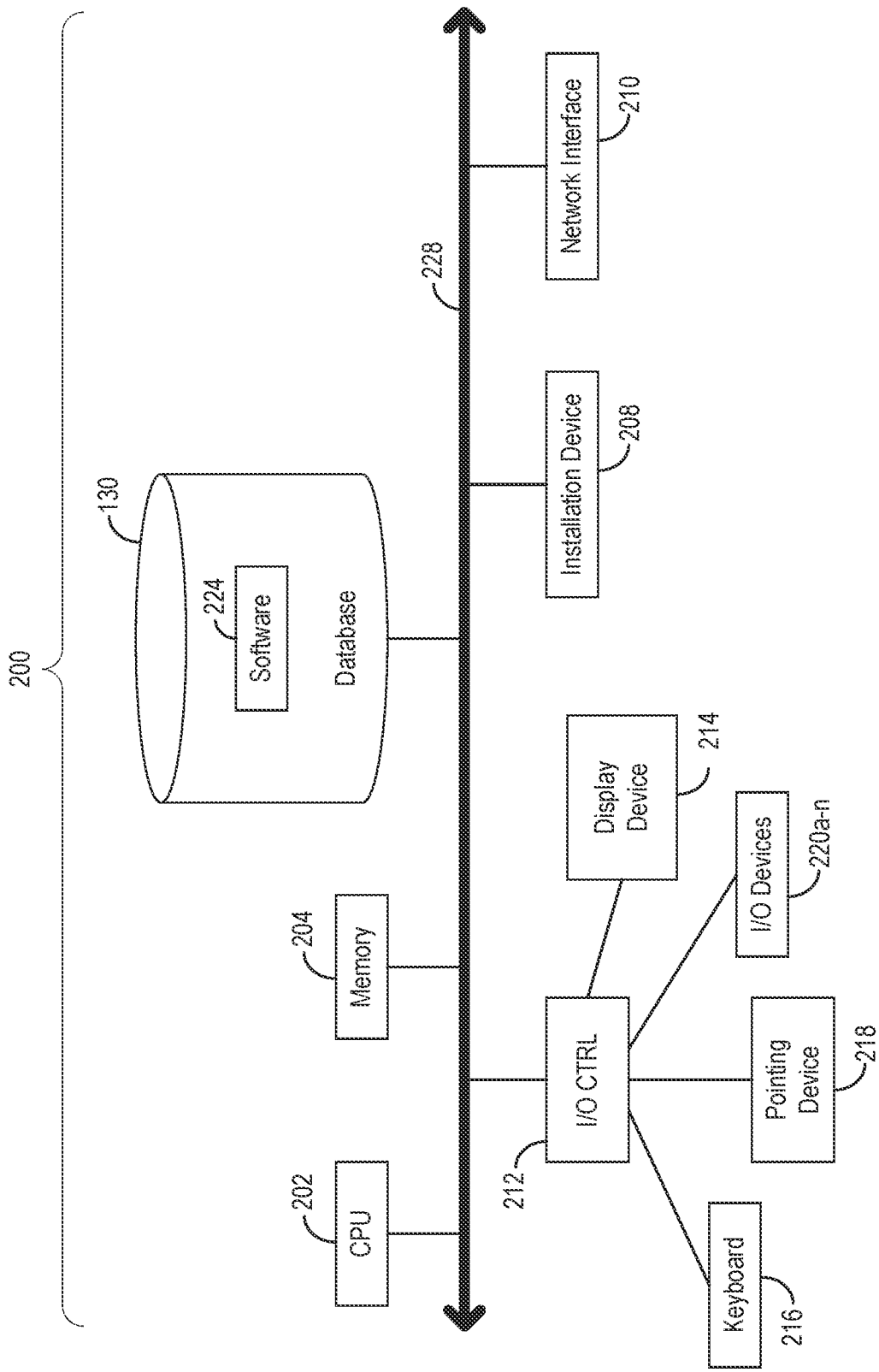
FIG. 2 is a block diagram depicting a computing device used to implement the database system of FIG. 1, according to some examples.

FIG. 2 is a block diagram depicting a computing device 200 used to implement the database system 100 of FIG. 1, according to some examples. Referring to FIGS. 1-2, the computing device 200 can be used to implement one or more disclosed features of the database system 100. As shown in FIG. 2, in some examples, the computing device 200 includes a central processing unit (CPU) 202, a memory unit 204, the database 130, an installation device 208, a network interface 210, an input/output (I/O) controller 212, a display device 214, a keyboard 216, and a pointing device 218 (e.g., a mouse). The database 130 can include, without limitation, software 224. The computing device 200 can also include additional optional elements, such as a memory port, a bridge, one or more input/output devices 220 (e.g., 220a-220n), cache memory in communication with the CPU 202, and so on.

In some examples, the CPU 202 can be any suitable logic circuitry that responds to and processes instructions fetched from the memory unit 204. In some examples, the CPU 202 is provided by a microprocessor unit. For example, in some examples, the microprocessor unit can include one or more microprocessors or any other suitable processor capable of operating as described herein. In various examples, the CPU 202 can utilize instruction level parallelism, thread level parallelism, different levels of cache, and/or multi-core processors. A multi-core processor can include two or more processing units on a single computing component.

In some examples, the memory unit 204 can include one or more memory chips capable of storing data and allowing any storage location to be directly accessed by the CPU 202. In various examples, the memory unit 204 can be Dynamic Random Access Memory (DRAM) or any variants, including Static Random Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), Extreme Data Rate DRAM (XDR DRAM), and so on. In some examples, the memory unit 204 or the database 130 can be non-volatile memory such as but not limited to, a Non-Volatile Read Access Memory (NVRAM), Flash Memory Non-Volatile Static RAM (nvSRAM), Ferroelectric RAM (FeRAM), Magnetoresistive RAM (MRAM), Phase-Change Memory (PRAM), Conductive-Bridging RAM (CBRAM), Silicon-Oxide-Nitride-Oxide-Silicon (SONOS), Resistive RAM (RRAM), Racetrack, Nano-RAM (NRAM), Millipede memory, and so on. The memory unit 204 can be based on any of the above-described memory devices, or any other available memory chips capable of operating as described herein. In some examples, the CPU 202 communicates with the memory unit 204 via a system bus 228. In other examples, the CPU 202 can communicate directly with the memory unit 204 via a memory port.

In some examples, the CPU 202 can communicate directly with cache memory via a secondary bus, sometimes referred to as a backside bus. In other examples, the CPU 202 can communicate with cache memory using the system bus 228. Cache memory typically has a faster response time than the memory unit 204, and is typically provided by SRAM, BSRAM, or EDRAM. In some examples, the CPU 202 communicates with various I/O devices 220 via a local system bus (e.g., the system bus 228). Various buses can be used to connect the CPU 202 to any of the I/O devices 220, including a PCI bus, a PCI-X bus, or a PCI-Express bus, or a NuBus. In examples in which the I/O devices 220 include the display device 214, the CPU 202 can use an Advanced Graphics Port (AGP) to communicate with the display device 214 or the I/O controller 212 for the display device 214.

In some examples, the CPU 202 can execute the functions of the parser system 110, including the parser 112 and the error parser 114. That is, the parser system 110 can be software instructions stored in the memory 204 to be executed by the CPU 202. The SQL statement 101 and the platform indicator 102 can be received by the CPU 202 locally from other software applications of the computing system 200. Alternatively, SQL statement 101 and the platform indicator 102 can be received via the network interface 210 from another computing system over a network, and the network interface 210 can send the SQL statement 101 and the platform indicator 102 to the CPU 202 via the bus 228. The data structures 120a-120n (in a token tree structure 125) as generated by the CPU 202 can be sent to the database 130 via the bus 228.

In various examples, a wide variety of I/O devices 220a-220n can be included in the computing device 200. For example, in various examples, the input devices of the I/O devices 220a-220n can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various examples, the output devices of the I/O devices 220a-220n can include, for example, video displays, graphical displays, speakers, headphones, inkjet printers, laser printers, and/or 3D printers. In some examples, I/O devices 220a-220n can include a combination of multiple input or output devices.

In some examples, addition I/O devices 220a-220n can have both input and output capabilities, including, for example, haptic feedback devices, touchscreen displays, multi-touch displays, and/or the like. Touchscreen, multi-touch displays, touchpads, touch mice, or other touch sensing devices can use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices can allow two or more contact points with the surface, allowing advanced functionality including, for example, pinch, spread, rotate, scroll, and/or other gestures. In some examples, some of the I/O devices 220a-220n, display devices 214a-214n, or group of devices can be augment reality devices. In some examples, the I/O devices (e.g., keyboard 216, pointing device 218, display devices 214, and/or I/O devices 220) can be controlled by the I/O controller 212. In some examples, an I/O device can also provide storage and/or an installation medium (e.g., installation device 208) for the computing device 200. In still other examples, the computing device 200 can provide USB connections to receive handheld USB storage devices. In further examples, an I/O device 220 can be a bridge between the system bus 228 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some examples, the display devices 214a-214n can be connected to the I/O controller 212. In various examples, the display devices 214a-214n can include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays can include, for example, stereoscopy, polarization filters, active shutters, autostereoscopy, and/or the like. Display devices 214a-214n can also include a head-mounted display (HMD). In some examples, display devices 214a-214n or the corresponding I/O controllers 212 can be controlled through or have hardware support for OPENGL, DIRECTX API, and/or other graphics libraries.

In some examples, the database 130 (e.g. one or more hard disk drives or redundant arrays of independent disks) can store other related software (e.g., the software 224) such as any program that can consume the data structures 120a-120n in the token tree structure 125. For example, examples of the software 224 include but are not limited to, the optimizer application, the database application, the editor, and so on. While the software 224 is shown to be implemented as part of the database 130, the software 224 can likewise be implemented by the CPU 202 and the memory unit 204.

Examples of hardware implementing the database 130 can include hard disk drive (HDD), optical drive including CD drive, solid-state drive (SSD), USB flash drive, and/or any other suitable device for storing data. In one example, the database 130 includes multiple volatile and non-volatile memories such as but not limited to, solid state hybrid drives that combine hard disks with solid state cache. In one example, the database 130 includes non-volatile, mutable, and/or read-only. In one example, the database 130 includes internal and can connect to the computing device 200 via the bus 228. Some storage devices 106 can be external and can be connect to the computing device 200 via the I/O device 220 that provides an external bus. In one example, the database 130 connects to the computing device 200 via the network interface 210 over a network.

In some examples, the computing device 200 can include the network interface 210 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one example, the computing device 200 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some examples, the network interface 210 can include, for example, a built-in network adapter, network interface card, PCMCIA network card, EXPRESSCARD network card, card bus network adapter, wireless network adapter, USB network adapter, modem, and/or any other suitable device for interfacing the computing device 200 to any type of network capable of communication and performing the operations described herein.

In various examples, the computing device 200 can be any workstation, desktop computer, laptop or notebook computer, tablet, server, handheld computer, mobile telephone, smartphone or other portable telecommunications device, media playing device, a gaming system, mobile computing device, and/or any other suitable type and/or form of computing, telecommunications, or media device that is capable of communication.

While some non-limiting examples of various computing devices of the system 200 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

Figure 3:
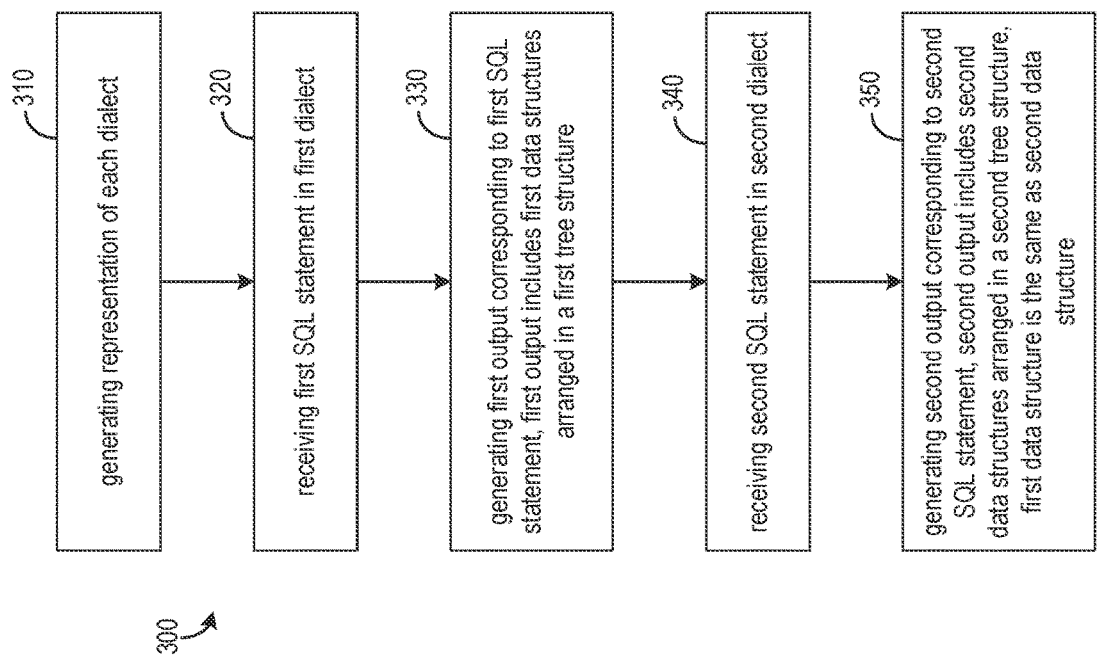
FIG. 3 is a flow diagram illustrating an example method for parsing SQL statements, according to some examples.

FIG. 3 is a flow diagram illustrating an example method 300 for parsing SQL statements, according to some examples. Referring to FIGS. 1-3, the method 300 can be performed by the parser 112. At 310, a representation of each of a plurality of dialects of SQL statements is generated.

At 320, a first SQL statement is received. The first SQL statement is in a first dialect of the plurality of dialects. At the same time, a first platform indicator (e.g., the platform indicator 102) can be received. The platform indicator indicates the platform (and therefore the dialect) from which the first SQL statement is generated. The first SQL statement and the first platform indicator can be received from any suitable application.

At 330, a first output corresponding to the first SQL statement is generated. The first output includes a plurality of first data structures arranged in a first tree structure. The first tree structure can be the token tree structure 125. The first data structures can be the data structures 120a-120n. Each of the plurality of first data structures corresponds to a portion of the first SQL statement.

At 340, a second SQL statement is received. The second SQL statement is in a second dialect of the plurality of dialects. The first and second dialects are different and are used by different platforms. At the same time, a second platform indicator (e.g., the platform indicator 102) can be received. The platform indicator indicates the platform (and therefore the dialect) from which the second SQL statement is generated. The first platform indicator and the second platform indicator identify different platforms. The second SQL statement and the second platform indicator can be received from any suitable application.

At 350, a second output corresponding to the second SQL statement is generated. The second output includes a plurality of second data structures arranged in a second tree structure. Each of the plurality of second data structures corresponds to a portion of the second SQL statement.

A first data structure of the plurality of first data structures is the same as a second data structure of the plurality of second data structures. The first data structure corresponds to a portion of the first SQL statement that invoke a same task to be performed with respect to the database 130 as the task invoked by a portion of the second SQL statement that corresponds to the second data structure. As described, given that the first SQL statement and the second SQL statement are in different dialects, the SQL characters of the portion of the first SQL statement and the SQL characters of the portion of the second SQL statement appear to be different (e.g., have different syntax, grammar, organization, arrangement, layout, and so on). As the first SQL statement and the second SQL statement invoke the same task, the first data structure and the second data structure are the same and are identified by a same ID.

FIG. 4 is a diagram illustrating SQL statements 400a-400c in various dialects, according to some examples. Referring to FIGS. 1-4, the SQL statement 400a is in a first dialect for a first platform (SQL Server®). The SQL statement 400b is in a second dialect for a second platform (Oracle®). The SQL statement 400c is in a third dialect for a third platform MySQL®. Each of the SQL statements 400a-400c is a select statement that gathers information such as "Time," "Subject," "Value," "First Value," "Last Value," "Cumulative Distribution (by Range)," and "Percent Rank" from the database 130. The SQL statements 400a-400c perform the same task, which is retrieving the same information from the database 130, and have the same output (e.g., the columns requested by the statement) from the parser system 110. As shown, the SQL statements 400a-400c have different syntax, grammar, organization, arrangement, layout, and so on. That is, the SQL characters of the SQL statements 400a-400c appear differently, as shown.

Figure 5:
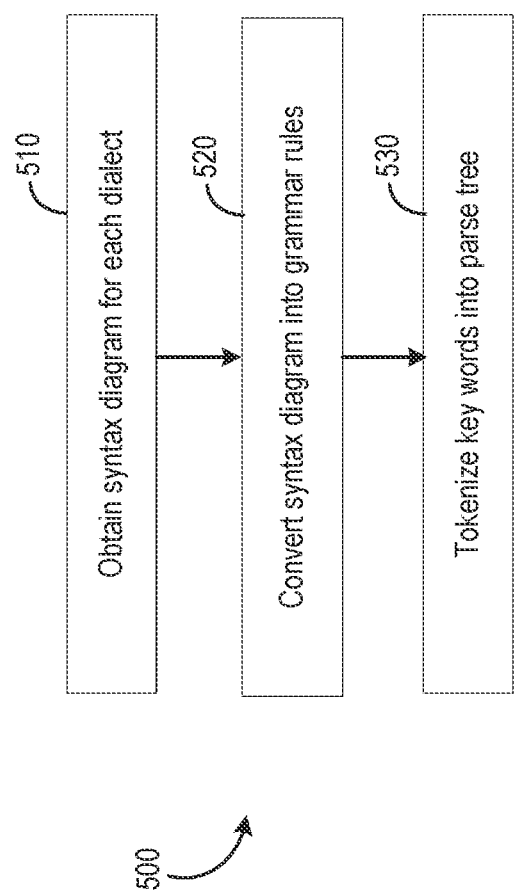
FIG. 5 is a flow diagram illustrating an example method for generating a representation of each of a plurality of dialects of SQL statements, according to some examples.
Figure 9B:
Figure 9D:

FIG. 5 is a flow diagram illustrating an example method 500 for generating a representation of each of a plurality of dialects of SQL statements, according to some examples. Referring to FIGS. 1-5, the method 500 is an example implementation of block 310 of the method 300. The representation refers to a tree representation, which is referred to as a parse tree. That is, the parse tree is formed for each of the dialects available for use. The parse tree is different from the token tree structure 125. The parse tree is used as a roadmap to generate the token tree structure 125 for any SQL statement in any dialect. The method 500 is performed by the parser 112. The method 500 is performed for each dialect, the SQL statements of which are received by the parser system 110.

At 510, a syntax diagram for each dialect is obtained. A syntax diagram for a dialect is a diagram that illustrates how to form a SQL statement with the correct syntax in that dialect. Syntax diagrams are different for different dialects. The typical use of a syntax diagram is a guide for users to form syntax-correct SQL statements in a particular dialect. The syntax diagrams (and updates thereof) are platform-specific and can be received automatically from resources (e.g., websites, downloadable files, and so on) of the respective platforms. Alternatively, an operator can manually load the syntax diagram into a suitable storage device (e.g., the memory 204) to be used by the parser 112. FIG. 6 is an example syntax diagram 600 for a dialect of SQL statements (SQL Server®), according to some examples. The syntax diagram 600 includes characters and symbols, and leaves placeholders for a user to fill in characters pertaining to particular SQL statements to be formed by the user.

At 520, syntax diagram for each dialect is converted into grammar rules. In other words, the parser 112 can comb through the information provided by the syntax diagram and petition the syntax diagram into pieces, and organize the pieces in a meaning arrangement to form the grammar rules. The grammar rules include lexer rules and parser rules, in some examples.

In some implementations, lexer rules can be used to identify keywords in the syntax diagrams and to tokenize those keywords into the parse tree. Each identified keyword is tokenized, meaning each identified keyword is given a unique lexer ID or tag by a lexer of the parser 112. This allows the parser 112 to process the lexer IDs instead of characters and words in the syntax diagram. In that regard, the lexer rules define tokenization, such that a token includes a unique lexer ID assigned to each keyword in the syntax diagram and annotations. In some examples, annotations refer to a classification of the item identified by the unique lexer ID. Examples of classifications include but are not limited to, keywords, identifiers, and so on. In that regard, FIG. 7 is a diagram illustrating lexer rules 700, according to some examples. The lexer rules 700 are for identifying keywords in a syntax diagram of a particular dialect that pertains to select statements.

In some implementations, parser rules define the manner in which keywords are combined to form the parse tree, such that the parse tree corresponds to a tree representation of the syntax diagram and includes the unique lexer IDs and the annotations. The parser rules define a statement type based on the order or arrangement of the lexer ID, e.g., if particular lexer IDs are organized in this order, then a SQL statement is of a particular type. SQL statements of a same type invoke a same task, function, or feature. FIG. 8 is a diagram illustrating parser rules 800, according to some examples.

At 530, the keywords are tokenized to form the parse tree. FIGS. 9A-9E are diagrams illustrating an example parse tree 900, according to some examples. Referring to FIGS. 1-9E, the unquoted words or characters in the parse tree 900 are the unique lexer IDs defined by the lexer rules. The values of the lexer IDs and naming of the lexer IDs are specific to a dialect and have a close correspondence to the syntax diagram of that dialect. Quoted words or characters are lexer tokens that are part of what the rule captured. The grammar rules that produce the parse tree 900 is specific to the platform and the syntax diagram thereof, thus, different platforms may not use the same lexer tokens or have the same syntax for the parse tree.

The parse tree 900 can further includes annotations (not shown in FIGS. 9A-9E). Annotations can be used to search for the unique lexer IDs. In some examples, the parser 112 can annotate certain tokens with a class type. For an example select statement:

select * /* comment */ from aschema.atable as t where a=1;

The unique lexer IDs can give a token a "Token Class" annotation. In the example select statement, "select" is given a "KEYWORD" token class value, and "/* comment */" is given a "MULTI LINE COMMENT" token class value. A token that is not a part of any special token class value is given a "TOKEN" token class value, which is a default class value. The token class value can be used to distinguish certain tokens from other tokens. An example related to the usage of "Token Class" annotation is a case in which a user wants to remove all comments. Using the "Token Class" annotation, the user can request all SINGLE LINE COM- MENT and MULTI LINE COMMENT fragments, and then remove those fragments from the tree. The user can then request the root to return the SQL text having all comments removed.

In some examples, the parser 112 can annotate certain tokens with a "SQL Type" annotation. Such annotation can be given by flagging a token as "special" in the grammar, and these flags can be later searched to facilitate annotating the token. In the example select statement, "*" is given the "STAR SQL" type value, a schema is given the "SCHEMA SQL" type value, and a table is given the "TABLE SQL" value type. This can also be used to differentiate certain tokens from others. An example related to the usage of "SQL Type," a fragment "aschema.atable as t" is a "TABLEREFERENCE" fragment type. A user can easily request all fragments with "TABLEREFERENCE" as the fragment type in a query (e.g., a SQL statement), and for each fragment with "TABLEREFERENCE" as the fragment type, the user can request the "SCHEMA" tokens and the "TABLE" tokens, and check if a token has an alias to allow the names to be broken down into elements.

In one example, annotations may appear as follow:

| | |
|---|---|
| select: | TokenClass: KEYWORD |
| *: | TokenClass: TOKEN, SQL Type: STAR |
| /* comment */: | TokenClass: MULTI_LINE_COMMENT |
| from: | TokenClass: KEYWORD |
| aschema: | TokenClass: KEYWORD, SQLType: SCHEMA |
| .: | TokenClass: Token |
| atable: | TokenClass: KEYWORD, SQLType: TABLE |
| as: | TokenClass: KEYWORD |
| t: | TokenClass: KEYWORD, SQLType: ALIAS |
| where: | TokenClass: KEYWORD |
| a: | TokenClass: KEYWORD, SQLType: COLUMN |
| =: | TokenClass: TOKEN |
| 1: | TokenClass: NUMBER |
| all whitespace: | TokenClass: WS |

In one example, a parse tree with annotations may appear as follow:

```
SQLCOMMAND: "select * /* comment */ from aschema.atable as t where a = 1;"
    SELECTSTATEMENT: "select * /* comment */ from aschema.atable as t where a = 1;"
        SELECTCLAUSE "select *"
            SELECTCOLUMN: " *"
        FROMCLAUSE: " /* comment */ from aschema.atable as t"
            TABLEREFERENCE: " aschema.atable as t"
        WHERECLAUSE: " where a = 1"
            CONDITION: " a = 1"
                CONDITIONBODY: " a = 1"
                    LEFTEXPRESSION: " a"
                        EXPRESSION: " a"
                            COLUMNNAME: " a"
                    RIGHTEXPRESSION: " 1"
                        LEFTEXPRESSION: " 1"
                            EXPRESSION: " 1"
```

An output for the SQL statement 101 of a dialect can be generated using the parse tree. For example, the first output corresponding to the first SQL statement of the first dialect (at block 330) and the second output corresponding to the second SQL statement of the second dialect (at block 350) can be generated in this manner. A first parse tree can be generated for the first dialect using the method 500. A second parse tree can be generated for the second dialect using the method 500. The first output can be generated based on the first SQL statement and the first parse tree, and the second output can be generated based on the second SQL statement and the second parse tree. The SQL statement 101 can refer to either the first SQL statement or the second SQL statement.

In some examples, lexer tokens relevant to the received SQL statement 101 are identified. The platform indicator 102 received with the SQL statement 101 can be used to identify the parse tree corresponding to the dialect supported by the platform identified by the platform indicator 102. For example, the first parse tree for the first dialect can be identified based on the first platform indicator received with the first SQL statement, and the second parse tree for the second dialect can be identified based on the second platform indicator received with the second SQL statement.

Once the relevant parse tree for the appropriate dialect is identified, the parser 112 iterates the parse tree (e.g., the parse tree 900) and recognizes the lexer tokens that are relevant to the SQL statement 101. In one example, the parser 112 checks, by traversing through the parse tree, whether the texts, characters, and words of the received SQL statement 101 correspond to keywords collected from the syntax diagram for the dialect. In one example, the parser 112 can check the lexer tokens in each node in the parser tree to determine whether the SQL statement 101 contains texts, characters, and words that correspond to the keywords (identified by unique lexer IDs), starting from a first childless node and moving up through the parse tree to its parent node, and the parent node of that node, etc. (e.g., in an upward direction through the parse tree). Once a child node in the parse tree is determined to be irrelevant to the SQL statement 101, the token is moved up to the parent node of that child node. In other words, the lexer of the parser 112 processes the SQL statement 101 and tags the texts, characters, and words of the SQL statement 101 that correspond to the lexer tokens of the parse tree.

The texts, characters, symbols, and words (e.g., various portions of the SQL statement 101) can be categorized into different unique API fragment IDs. The parser 112 can generate an annotated parse tree using the lexer IDs, the API fragment IDs, and the texts, characters, and words of the received SQL statement 101. In this manner, the SQL statement 101 is tokenized, i.e., the parser 112 can understand what to expect based on the lexer tokens.

Figure 10A:

In that regard, FIGS. 10A-10B are diagrams illustrating an example annotated parse tree 1000, according to some examples. Referring to FIGS. 1-10B, the words that precede the symbol "=>" are the rules (e.g., the lexer IDs) that are considered to be important by the parser 112. All uppercase words that follow the symbol "=>" are the unique API fragment IDs. The quoted words are the SQL text ranges (e.g., the fragments) of the SQL statement 101 that correspond to the unique API fragment IDs and the lexer IDs. The SQL text ranges are made up from all of the tokens that correspond to the start and end offset of that fragment. A child fragment contains a subset of such tokens that correspond to that fragment's start offset and end offset. The annotated parse tree 1000 still contains logic specific to the dialect of the SQL statement 101 as the annotated parse tree 1000 map rules specific to that dialect to the unique API IDs. In some examples, the annotated parse tree 1000 is an annotated version of the parse tree 900, with lexer IDs irrelevant to the SQL statement 101 removed, and with the API fragment IDs and the SQL text ranges added.

Figure 11B:

After the annotated parse tree 1000 is generated, the parser 112 can iterate the annotated parse tree 1000 to generate an API tree. For example, the annotated parse tree 1000 can be used to factor out interfaces that correspond to API fragment IDs in the annotated parse tree 1000. The interfaces are factored out using factory patterns, such that responsive to determining that there is an interface specific to a fragment ID, the interface object is retrieved. The interface object represents a part of the annotated parse tree 1000. If an interface object is not in the list of interfaces, then a generic fragment is assigned. In that regard, FIGS. 11A and 11B are diagrams illustrating an example API tree 1100, according to some examples. Referring to FIGS. 1-11B, the API tree 1100 includes interfaces that correspond to the API fragment IDs in the annotated parse tree 1000. All interfaces in the API tree 1100 inherit from a base interface ISQLFragment which contains the base functionality for accessing child tokens and fragments along with any annotations that the child tokens and fragments may have. In some examples, not all enums (fragment IDs) correspond to a unique interface. In some examples in which there are no helper methods required, the parser 112 can use the base interface ISQLFragment instead of dealing with another interface. The API tree 1100 does not contain any logic that is platform-specific or dialect-specific. All the annotations and unique IDs in the API tree 1100 are cross-dialect. Accordingly, the API tree 1100 can be the first output or the second output. The interfaces in the API tree 1100 correspond to the first data structures or the second data structures.

Figure 12:
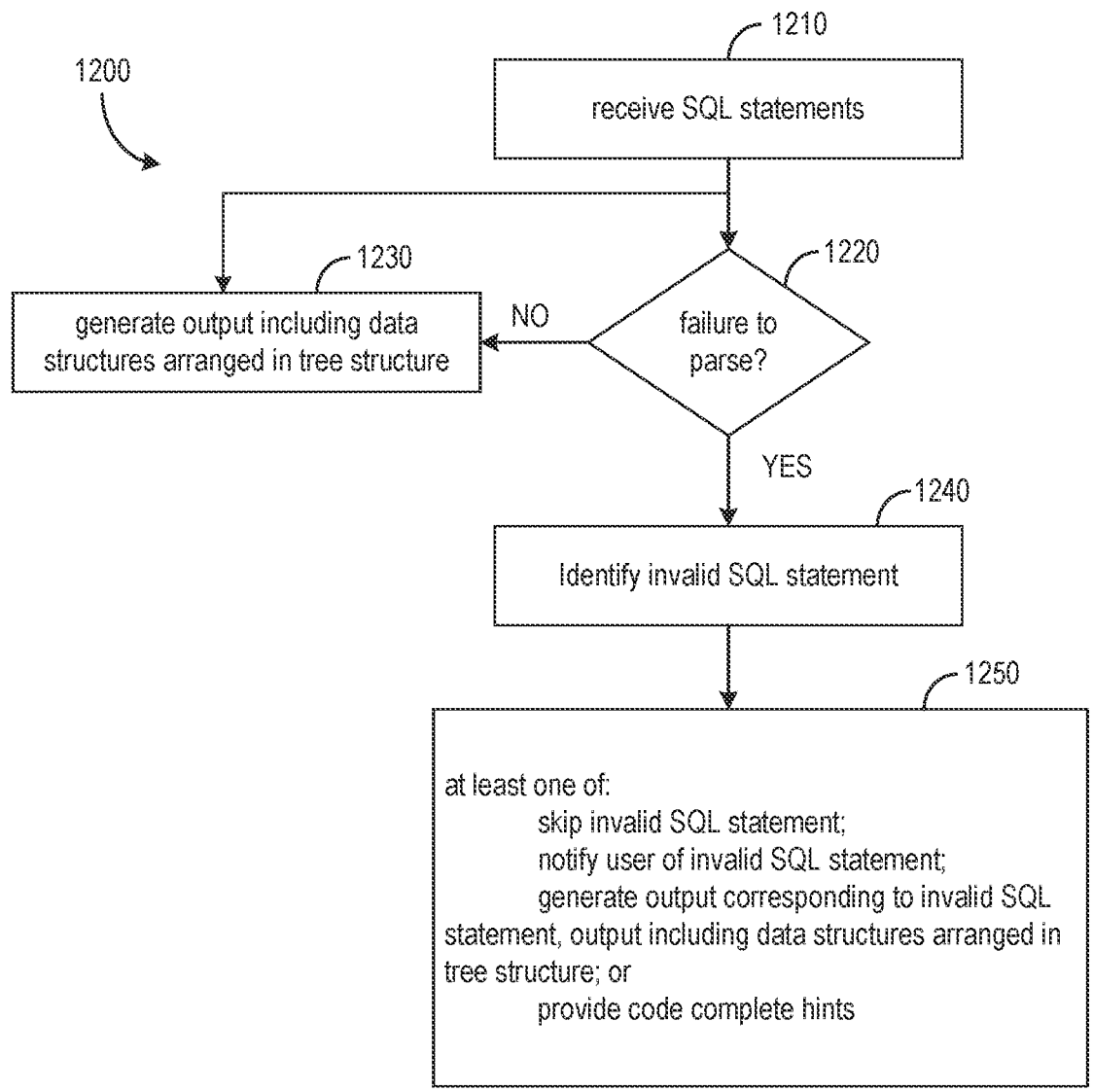
FIG. 12 is a flow diagram illustrating an example method for addressing errors in an SQL statement, according to some examples.

FIG. 12 is a flow diagram illustrating an example method 1200 for addressing errors in an SQL statement, according to some examples. Referring to FIGS. 1-12, the method 1200 can be performed by the parser system 110, including the parser 112 and the error parser 114, in some arrangements.

At 1210, the parser system 110 (e.g., the parser 112) receives SQL statements. In some examples, the parser system 110 receives a large number of SQL statements in batch (as a group), including alphanumeric characters and symbols corresponding to the SQL statements. The alphanumeric characters and symbols and therefore SQL statements corresponding to those alphanumeric characters and symbols are processed (parsed) by the parser system 110 (e.g., the parser 112) in sequence.

In some arrangements, all of the SQL statements received are in a single dialect, such that the parser system 110 receives a single platform indicator 102 that identifies the dialect of all of the SQL statements received. In some arrangements, the SQL statements received are in multiple dialects, such that the parser system 110 receives a different platform indicator 102 that identifies each of the multiple dialects and the alphanumeric characters and symbols (e.g., beginning and end characters/symbols) corresponding to each of the multiple dialects. In that regard, examples of block 1210 include but are not limited to, blocks 320 and 340.

At 1220, the parser 112 determines whether the parser 112 fails to parse one of the received SQL statements while attempting to parse that SQL statement. In some examples, the parser 112 attempts to parse each of the received SQL statements (the alphanumeric characters and symbols thereof). If the parser 112 is able to parse the SQL statement, the parser 112 has not failed to parse that SQL statement (block 1220: NO). On the other hand, if the parser 112 is unable to parse the SQL statement, the parser 112 has failed to parse that SQL statement (block 1220: YES). In some examples, in response to the parser 112 successfully parsing a previous SQL statement (e.g., previous alphanumeric characters and symbols corresponding to the previous SQL statement), the parser 112 begins to parse the remaining alphanumeric characters and symbols corresponding to remaining ones of the receives SQL statements. The parser 112 may fail to parse the alphanumeric characters and symbols corresponding to the SQL statement immediately following the successfully parsed previous SQL statement (e.g., immediately following the end characters/symbols of the successfully parsed previous SQL statement). Reasons for failure to parse include but are not limited to, syntax errors in the alphanumeric characters and symbols corresponding to the SQL statement, incomplete SQL statement (e.g., the user has not completed typing all the alphanumeric characters and symbols corresponding to the SQL statement), the parser 112 being outdated, and so on.

In response to determining that the parser 112 has not failed to parse a SQL statement (block 1220: NO), the parser 112 generates an output including data structures arranged in a tree structure, at 1230. The output can be the API tree 1100 generated in the manner described herein. Examples of block 1230 include but are not limited to, blocks 330 and 350. In response to the output being generated for a successfully parsed SQL statement, the method 1200 proceeds to block 1220 for a subsequent SQL statement (e.g., the alphanumeric characters and symbols corresponding thereto) immediately following the end characters/symbols of the successfully parsed previous SQL statement.

On the other hand, in response to determining that the parser 112 has failed to parse the SQL statement (block 1220: YES), the parser 112 notifies the error parser 114, and the error parser 114 identifies the invalid SQL statement at 1240. The parser 112 may contain logic therein that triggers the error parser 114 to perform blocks 1240 and 1250 in response to the parser 112 experiencing the failure.

In some arrangements, the error parser 114 identifies the invalid SQL statement by identifying or defining the beginning and the end of the invalid SQL statement (e.g., the beginning character/symbol and the end character/symbol) of the invalid SQL statement. In some example, the beginning of the invalid SQL statement is a beginning character/symbol that immediately follows the end character/symbol of a previous SQL statement of the plurality of SQL statements received, where the previous SQL statement has been successful parsed by the parser 112.

The end of the invalid SQL statement can be determined based on the rules/logic of the error parser 114. In some examples, the end of the invalid SQL statement corresponds to an end character/symbol, where the end character/symbol and the beginning character/symbol together define the invalid SQL statement for which the error parser 114 can generate the output (e.g., the data structures arranged in the tree structure) in the manner described. In some examples, the end of the invalid SQL statement corresponds to a special character/symbol known to represent an end of an SQL statement in the syntax of the dialect corresponding to the invalid SQL statement, such that the invalid SQL statement ends on the first special character/symbol after the beginning character/symbol. Examples of such special character/symbol include but are not limited to, a semicolon, a bracket, and so on.

At 1250, the error parser 114 performs one of: skipping the invalid SQL statement, notify the user of invalid SQL statement, generate an output corresponding to the invalid SQL statement, or providing code complete hints.

In some arrangements, the error parser 114 skips the invalid SQL statement by instructing the parser 112 to beginning parsing a subsequent SQL statement following the invalid SQL statement. The error parser 114 relays the end character/symbol of the invalid SQL statement to the parser 112. The parser 112 can continue the method 1200 at block 1220, starting from the character/symbol immediately following the end character/symbol of the invalid SQL statement.

In some arrangements, the parser 112 (instead of the error parser 114) identifies or defines the beginning and the end of each invalid SQL statement in the manner described with respect to the error parser 114, stores beginning and the end of each invalid SQL statement (e.g., the text ranges of each invalid SQL statement), and skips each invalid SQL statement. The parser 112 can relay the beginning and the end of each invalid SQL statement of the received SQL statements to the error parser 114. The error parser 114 can notify the user of each invalid SQL statement, generate an output corresponding to each invalid SQL statement, or providing code complete hints for each invalid SQL statement after the parser 112 parses all valid SQL statements of the received SQL statements or while the parser 112 is parsing some of the received SQL statements.

In some arrangements, the error parser 114 can notify the user of the invalid SQL statement by causing the display device 214 to display the symbols/characters of the invalid SQL statement, from the beginning symbol/character to the end symbol/character.

In some arrangements, the error parser 114 can generate the output corresponding to the invalid SQL statement, where the output includes the data structures arranged in the tree structure. The error parser 114 can provide (e.g., display via the display device 214) the code complete hints. The error parser 114 can generate the output and the code complete hints using predefined codes (e.g., rules and logic) that extract additional information from the invalid SQL statement which the parser 112 has failed to parse.

The rules and logic of the error parser 114 are more flexible than the rules and logic of the parser 112 in that the rules and logic of the error parser 114 can forgive or accept the syntax errors and missing information. The rules and logic of the parser 112 corresponds to a set of rigid rules (e.g., ANTLR). As described, lexer rules of the parser 112 can be used to identify keywords in the syntax diagrams and to tokenize those keywords into a parse tree (e.g., the parse tree 900). The parser 112 iterates the parse tree and attempts to recognize lexer tokens that are relevant to an SQL statement, and fails to parse the SQL statement if character(s)/symbol(s) corresponding to one or more of the lexer tokens are incorrect or missing.

In some arrangements, the error parser 114 uses the same lexer rules and the same parse tree (e.g., the parse tree 900) used by the parser 112 and applies the rules and logic of the error parser 114 to the characters/symbols of the invalid SQL statement to generate the output or the code complete hints. That is, both the parser 112 and the error parser 114 use the same lexer rules and the same parse tree for a dialect, and the lexer rules and the parse tree are applied to the invalid SQL statement that is in that dialect. The error parser 114 generates an annotated parse tree similar to the annotated parse tree 1000 and an API tree similar to the API tree 1100 using the rules and logic of the error parser 114. The rules and logic of the error parser 114 are more forgiving in that the characters/symbols (e.g., SQL text ranges) of the invalid SQL statement do not need to exactly match to the lexer IDs. In that regard, FIG. 13A-13E are diagrams illustrating example error parse trees 1300a-1300e used by the error parser 114 (FIG. 1), according to some examples. The error parse trees 1300a-1300e are generated based on the syntax diagrams of different dialects. The error parse trees 1300a-1300e predict certain known errors in the SQL statements (e.g., the SQL statements (1)-(5)) and allow these errors to be tolerated. The error parse trees 1300a-1300e can be applied to a received invalid SQL statement to ignore certain errors in the invalid SQL statement and to generate (if possible) the output, which is the API tree similar to the API tree 1100. In some examples, an error parse tree indicates a start position and stop position of a given error and indicates a type of error. Examples of types of errors include but are not limited to, Data Definition Language (DML) errors, Data Manipulation Language (DDL) or OTHER errors, UNKNOWN errors, and so on. In some examples, the error parse tree is flat with no children, similar to the parse three 900 with the last node being a node for error indication (e.g., the last node being "UnknownCommand"), where the last node is associated with all tokens with no child fragments. The error parser 114 then takes such an error parse tree and produces the API tree (e.g., the API tree 1100), for example, by performing the annotation to generate an annotated parse tree (e.g., the annotated parse tree 1000) and at the same time generating the API tree. The error parse trees 1300a-1300e each corresponds to a known error such that, if the known error exists in a SQL statement that the parser 112 has failed to parse, the error parser 114 can nevertheless generate the API tree using based on the error parse trees.

Referring to FIGS. 1-13E, the error parse tree 1300a corresponds to (can be used to address) an invalid SQL statement having a missing keyword (a syntax error). For example, the error parse tree 1300a can be applied to the following SQL statement (1):

create or replace no force view aName select * from atable (1).

The SQL statement (1) is missing the "as" keyword before the select statement starts (e.g., before "select"). The parser 112 fails to parse the SQL statement (1) given that the "as" keyword is omitted. The error parser 114 scans the SQL statement (1) and detects the "Select" keyword before the "as" keyword is detected. The error parser 114 identifies the error type which is syntax error (missing keyword "as" before "Select") and applies the error parse tree 1300a corresponding to the error type. Based on the rules and logic corresponding to the error parse tree 1300a, the error parser 114 forgives the missing "as" keyword.

In some examples, the error parse tree 1300a is the same as a parse tree for a valid "Select" statement with the "as" keyword is properly present. In some examples, the parser 112 can generate a first output corresponding to a valid "Select" statement with the "as" keyword properly present, where the first output includes data structures (e.g., interfaces) arranged in a tree structure (e.g., an API tree). The error parser 114 can generate a second output corresponding to the invalid SQL statement (1), where the second output includes data structures (e.g., interfaces) arranged in a tree structure (e.g., an API tree). The first output and the second output are the same (e.g., having the same interfaces arranged in a same API tree). Accordingly, even as the SQL statement (1) is missing the "as" keyword, the error parser 114 can nevertheless arrive as the same result as the parser 112 would with a valid SQL statement.

The error parse tree 1300b corresponds to (can be used to address) an invalid SQL statement that is incomplete. The user may not have completed typing the SQL statement in an editor, and the parser system 110 is functioning in the background of the editor for providing code-complete functionality. For example, the error parse tree 1300b can be applied to the following SQL statement (2):

select max(salary) s from (2).

The invalid SQL statement (2) is missing a table reference corresponding to a missing node (e.g., the TABLEREFERENCE node) as compared to a valid version of the invalid SQL statement (2). The parser 112 fails to parse the invalid SQL statement (2) given that the invalid SQL statement (2) is incomplete and lacking the table reference. The error parser 114 scans the invalid SQL statement (2) detects that the table reference is missing, identifies the error type which is missing table reference, and applies the error parse tree 1300*b* corresponding to the error type. Based on the rules and logic corresponding to the error parse tree 1300*b*, the error parser 114 determines that if "atable" is added to the invalid SQL statement (2), then FROMCLAUSE would appear to be "FROMCLAUSE: from atable," and "TABLEREFERENCE: atable" would also appear. For code complete functionality, the error parser 114 causes the display device 214 to display code complete hints indicating the symbols/characters of the invalid SQL statement (2) (from the beginning symbol/character to the end symbol/character) and that the FROMCLAUSE is expecting a table reference. The code complete hints can also indicate that the error location is after "from" via the display device 214.

The error parse tree 1300*c* corresponds to (can be used to address) an invalid SQL statement that is incomplete. The user may not have completed typing the SQL statement in an editor, and the parser system 110 is functioning in the background of the editor for providing code-complete functionality. For example, the error parse tree 1300*c* can be applied to the following SQL statement (3):

select max(salary) s from dbo. (3).

The invalid SQL statement (3) is has a table reference but is missing a table or view name as compared to a valid version of the SQL statement (3). The parser 112 fails to parse the invalid SQL statement (3) given that the invalid SQL statement (3) is incomplete and lacking the table or view name. The error parser 114 scans the invalid SQL statement (3) detects that the table or view name is missing, identifies the error type which is missing table or view name, and applies the error parse tree 1300*c*. Based on the rules and logic corresponding to the error parse tree 1300*c*, the error parser 114 determines that if the table or view name is added, then the invalid SQL statement (3) would be valid. For code complete functionality, the error parser 114 causes the display device 214 to display code complete hints indicating the symbols/characters of the invalid SQL statement (3) (from the beginning symbol/character to the end symbol/character) and that the table or view name is expected. The code complete hints can also indicate that the error location is after "dbo." via the display device 214.

The error parse tree 1300*d* corresponds to (can be used to address) an invalid SQL statement that is incomplete. The user may be modifying the SQL statement in an editor, and the parser system 110 is functioning in the background of the editor for providing code-complete functionality. For example, the error parse tree 1300*d* can be applied to the following SQL statement (4):

select distinct col1, , 9, pow(2,3) into bob from emp where col1=89 (4).

The invalid SQL statement (4) is missing a column reference in the select list as compared to a valid version of the invalid SQL statement (4). The parser 112 fails to parse the SQL statement (4) given that the invalid SQL statement (4) is incomplete and lacking the column reference in the select list, identifies the error type which is missing column reference, and applies the error parse tree 1300*d* corresponding to the error type. Based on the rules and logic corresponding to the error parse tree 1300*d*, the error parser 114 scans the invalid SQL statement (4) detects that an expression is missing between the commas and forgives the issue. The error parse tree 1300*d* is missing SELECTCOLUMN as compared to a parse tree for the valid version of the invalid SQL statement (4). Based on the rules and logic corresponding to the error parse tree 1300*d*, the error parser 114 determines that if the column reference is added, then the invalid SQL statement (4) would be valid. For code complete functionality, the error parser 114 causes the display device 214 to display code complete hints indicating the symbols/characters of the invalid SQL statement (4) (from the beginning symbol/character to the end symbol/character) and that a column reference with respect to SELECTCOLUMN is expected. The code complete hints can also indicate that the error location is between the commas ", ," via the display device 214.

The error parse tree 1300*e* corresponds to (can be used to address) an invalid SQL statement including a reserved keyword (e.g., "select") as an unquoted object name (a syntax error). For example, the error parse tree 1300*e* can be applied to the following SQL statement (5):

create table tablename (col int, col2 varchar2(25), select int) as (select * from atable) (5).

In the invalid SQL statement (5), "select" is used as a table column. The parser 112 fails to parse the invalid SQL statement (5) given that the token "select" which is a reserved keyword is unexpected as a table column. The error parser 114 scans the SQL statement (5), identifies the error type which is using a reserved keyword as an unquoted object name, applies the error parse tree 1300*e* corresponding to the error type. Based on the rules and logic corresponding to the error parse tree 1300*e*, the error parser 114 forgives the issue. In other words, the error parser 114 processes the SQL statement (5) as if the SQL statement (5) has an inappropriate column name.

In some arrangements, the error parser 114 identifies a statement type for the invalid SQL statement by scanning through the invalid SQL statement and determining keywords indicative of the statement type. Examples of statement types include but are not limited to, "Select" statements, "Insert" statements, "Update" statements, "Pre-procedure" statements, "Pre-function" statements, "Create Tables" statements, and so on. Examples of keywords include but are not limited to, "select," "insert," "update," "pre-procedure," "pre-function," "create,", "table," and so on. In response to the error parser 114 detecting a keyword (e.g., "select") or a fuzzy match thereof within the characters/symbols of the invalid SQL statement, the error parser 114 identifies a corresponding statement type (e.g., "Select" statements) for the invalid SQL statement. The identified statement type can be used to select different rules/logic to be applied to the invalid SQL statement, to generate the output (e.g., the tree structure). For example, in response to identifying the statement type, the error parser 114 selects additional sets of rules/logic (e.g., one or more error parse trees) corresponding to the statement type to be applied to the invalid statement. The error parser 114 may apply the selected sets of rules/logic (e.g., selected error parse trees) to the invalid SQL statement until one set of rules/logic generates the output.

In the situations, the error parser 114 does not understand the error (the error is of the error type UNKNOWN) because the error parser 114 does not contain any rules or logics embodied in error parse trees that can be used to address that error. In such situations, the error parser 114 generates an API tree containing a root node called "ISQLCommand" having a child corresponding to ISQLFragment of type "UNKNOWN," where the "UNKNOWN" node is associated with all of the texts of the SQL statement that are a part of that error block.

The arrangements described herein have been described with reference to drawings. The drawings illustrate certain details of specific arrangements that implement the systems, methods and programs described herein. However, describing the arrangements with drawings should not be construed as imposing on the disclosure any limitations that can be present in the drawings.

It should be understood that no claim element herein is to be construed under the provisions of 35 U.S.C. § 112(f), unless the element is expressly recited using the phrase "means for."

As used herein, the term "circuit" can include hardware structured to execute the functions described herein. In some arrangements, each respective "circuit" can include machine-readable media for configuring the hardware to execute the functions described herein. The circuit can be embodied as one or more circuitry components including, but not limited to, processing circuitry, network interfaces, peripheral devices, input devices, output devices, sensors, etc. In some arrangements, a circuit can take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on).

The "circuit" can also include one or more processors communicatively coupled to one or more memory or memory devices. In this regard, the one or more processors can execute instructions stored in the memory or can execute instructions otherwise accessible to the one or more processors. In some arrangements, the one or more processors can be embodied in various ways. The one or more processors can be constructed in a manner sufficient to perform at least the operations described herein. In some arrangements, the one or more processors can be shared by multiple circuits (e.g., circuit A and circuit B can comprise or otherwise share the same processor which, in some example arrangements, can execute instructions stored, or otherwise accessed, via different areas of memory). Alternatively or additionally, the one or more processors can be structured to perform or otherwise execute certain operations independent of one or more co-processors. In other example arrangements, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some arrangements, the one or more processors can be external to the apparatus, for example the one or more processors can be a remote processor (e.g., a cloud based processor). Alternatively or additionally, the one or more processors can be internal and/or local to the apparatus. In this regard, a given circuit or components thereof can be disposed locally (e.g., as part of a local server, a local computing system, etc.) or remotely (e.g., as part of a remote server such as a cloud based server). To that end, a "circuit" as described herein can include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device can include non-transient volatile storage media, non-volatile storage media, non-transitory storage media (e.g., one or more volatile and/or non-volatile memories), etc. In some arrangements, the non-volatile media can take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media can take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device can be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and the nature or number of discrete processes can be altered or varied. The order or sequence of any element or apparatus can be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or can be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions can be made in the design, operating conditions and arrangement of the arrangements without departing from the scope of the present disclosure as expressed in the appended claims.

What is claimed is:

1. A method, comprising:
   determining that a parser fails to parse an invalid structured query language (SQL) statement due to an error in a text range of the invalid SQL statement, the parser applying a first set of rules to the invalid SQL statement; and
   in response to determining that the parser fails to parse the invalid SQL statement,
   triggering, by the parser, an error parser to address the failure, wherein the error parser applies a different set of rules to the invalid SQL statement, the different set of rules comprising a plurality of error parse trees, each of the plurality of error parse trees predicting a known error in a SQL statement and allowing the known error to be tolerated and a parse output to be generated for the invalid SQL statement;
   identifying, by the error parser, a statement type and an error type for the invalid SQL statement by scanning through the invalid SQL statement and determining keywords included in the invalid SQL statement;
   selecting, by the error parser and from the plurality of error parse trees comprised in the different set of rules, one or more error parse trees corresponding to the identified statement type and error type;
   applying, by the error parser, the selected one or more error parse trees to the invalid SQL statement to generate a parse output corresponding to the invalid SQL statement by tolerating the error in the text range of the invalid SQL statement according to rules of the selected one or more error parse trees, the parse output comprising a plurality of data structures arranged in a tree structure, each of the plurality of data structures corresponds to a portion of the invalid SQL statement;
   displaying, by the error parser and based on the parse output, code complete hints on a display device, wherein the code complete hints indicate a beginning symbol and an end symbol of the invalid SQL statement where the error may be corrected.

2. The method of claim 1, wherein the parser fails to parse the invalid SQL statement due to one or more of the invalid SQL statement containing at least one syntax error, the invalid SQL statement being incomplete, or the parser being out-of-date.

3. The method of claim 1, further comprising receiving, by the parser, a plurality of SQL statements, the plurality of SQL statements comprising the invalid SQL statement, wherein
   identifying the invalid SQL statement comprises identifying a beginning and an end of the invalid SQL statement;
   the beginning of the invalid SQL statement corresponds to a beginning character or symbol following a previous SQL statement; and
   the end of the invalid SQL statement corresponds to an end character or symbol.

4. The method of claim 1, further comprising generating a representation of each of a plurality of dialects of SQL statements, wherein
   generating the representation comprises generating grammar rules for the SQL statements of each of the plurality of dialects based on a syntax diagram for each of the plurality of dialects; and
   the grammar rules comprise lexer rules used to identify keywords in the syntax diagram and tokenize the keywords as tokens.

5. The method of claim 4, wherein generating the representation of each of the plurality of dialects of SQL statements further comprises converting the syntax diagram for each of the plurality of dialects into a parse tree based on the grammar rules.

6. The method of claim 5, further comprising:
   receiving, by the parser, a plurality of SQL statements, the plurality of SQL statements comprising the invalid SQL statement and a valid SQL statement; and
   generating, by the parser, another output corresponding to the valid SQL statement based on the parse tree, the another output comprises another plurality of data structures arranged in another tree structure.

7. A non-transitory computer-readable medium having computer-readable instructions such that, when executed by a processor, causes the processor to:
   determine that a parser fails to parse an invalid structured query language (SQL) statement due to an error in a text range of the invalid SQL statement, the parser applying a first set of rules to the invalid SQL statement; and
   in response to determining that the parser fails to parse the invalid SQL statement, trigger, by the parser, an error parser to address the failure, wherein the error parser applies a different set of rules to the invalid SQL statement, the different set of rules comprising a plurality of error parse trees, each of the plurality of error parse trees predicting a known error in a SQL statement and allowing the known error to be tolerated and a parse output to be generated for the invalid SQL statement;
   identify, by the error parser, a statement type and an error type for the invalid SQL statement by scanning through the invalid SQL statement and determining keywords included in the invalid SQL statement;
   select, by the error parser and from the plurality of error parse trees comprised in the different set of rules, one or more error parse trees corresponding to the identified statement type and error type;
   apply, by the error parser, the selected one or more error parse trees to the invalid SQL statement to generate a parse output corresponding to the invalid SQL statement by tolerating the error in the text range of the invalid SQL statement according to rules of the selected one or more error parse trees, the parse output comprising a plurality of data structures arranged in a tree structure, each of the plurality of data structures corresponds to a portion of the invalid SQL statement;
   display, by the error parser and based on the parse output, code complete hints on a display device, wherein the code complete hints indicate a beginning symbol and an end symbol of the invalid SQL statement where the error may be corrected.

8. The non-transitory computer-readable medium of claim 7, wherein the processor is further caused to receive a plurality of SQL statements, the plurality of SQL statements comprising the invalid SQL statement, wherein
- identifying the invalid SQL statement comprises identifying a beginning and an end of the invalid SQL statement;
- the beginning of the invalid SQL statement corresponds to a beginning character or symbol following a previous SQL statement; and
- the end of the invalid SQL statement corresponds to an end character or symbol.

9. The non-transitory computer-readable medium of claim 7, wherein the processor is further caused to generate a representation of each of a plurality of dialects of SQL statements, wherein
- generating the representation comprises generating grammar rules for the SQL statements of each of the plurality of dialects based on a syntax diagram for each of the plurality of dialects; and
- the grammar rules comprise lexer rules used to identify keywords in the syntax diagram and tokenize the keywords as tokens.

10. The non-transitory computer-readable medium of claim 9, wherein generating the representation of each of the plurality of dialects of SQL statements further comprises converting the syntax diagram for each of the plurality of dialects into a parse tree based on the grammar rules.

11. The non-transitory computer-readable medium of claim 10, wherein the processor is further caused to:
- receive a plurality of SQL statements, the plurality of SQL statements comprising the invalid SQL statement and a valid SQL statement; and
- generate another output corresponding to the valid SQL statement based on the parse tree, the another output comprises another plurality of data structures arranged in another tree structure.

12. A system, comprising:
a memory unit; and
a processor configured to:
- determine that a parser fails to parse an invalid structured query language (SQL) statement due to an error in a text range of the invalid SQL statement, the parser applying a first set of rules to the invalid SQL statement; and
- in response to determining that the parser fails to parse the invalid SQL statement, trigger, by the parser, an error parser to address the failure, wherein the error parser applies a different set of rules to the invalid SQL statement, the different set of rules comprising a plurality of error parse trees, each of the plurality of error parse trees predicting a known error in a SQL statement and allowing the known error to be tolerated and a parse output to be generated for the invalid SQL statement;
- identify, by the error parser, a statement type and an error type for the invalid SQL statement by scanning through the invalid SQL statement and determining keywords included in the invalid SQL statement;
- select, by the error parser and from the plurality of error parse trees comprised in the different set of rules, one or more error parse trees corresponding to the identified statement type and error type;
- apply, by the error parser, the selected one or more error parse trees to the invalid SQL statement to generate a parse output corresponding to the invalid SQL statement by tolerating the error in the text range of the invalid SQL statement according to rules of the selected one or more error parse trees, the parse output comprising a plurality of data structures arranged in a tree structure, each of the plurality of data structures corresponds to a portion of the invalid SQL statement;
- display, by the error parser and based on the parse output, code complete hints on a display device, wherein the code complete hints indicate a beginning symbol and an end symbol of the invalid SQL statement where the error may be corrected.

13. The system of claim 12, wherein the parser fails to parse the invalid SQL statement due to one or more of the invalid SQL statement containing at least one syntax error, the invalid SQL statement being incomplete, or the parser being out-of-date.

14. The system of claim 12, wherein the processor is further configured to receive a plurality of SQL statements, the plurality of SQL statements comprising the invalid SQL statement, wherein
- identifying the invalid SQL statement comprises identifying a beginning and an end of the invalid SQL statement;
- the beginning of the invalid SQL statement corresponds to a beginning character or symbol following a previous SQL statement; and
- the end of the invalid SQL statement corresponds to an end character or symbol.

15. The system of claim 12, wherein the processor is further configured to generate a representation of each of a plurality of dialects of SQL statements, wherein
- generating the representation comprises generating grammar rules for the SQL statements of each of the plurality of dialects based on a syntax diagram for each of the plurality of dialects; and
- the grammar rules comprise lexer rules used to identify keywords in the syntax diagram and tokenize the keywords as tokens.

16. The system of claim 15, wherein generating the representation of each of the plurality of dialects of SQL statements further comprises converting the syntax diagram for each of the plurality of dialects into a parse tree based on the grammar rules.

17. The system of claim 16, wherein the processor is further configured to:
- receive a plurality of SQL statements, the plurality of SQL statements comprising the invalid SQL statement and a valid SQL statement; and
- generate another output corresponding to the valid SQL statement based on the parse tree, the another output comprises another plurality of data structures arranged in another tree structure.

* * * * *